(12) United States Patent
Gawne

(10) Patent No.: US 10,152,629 B2
(45) Date of Patent: Dec. 11, 2018

(54) METHODS OF PROCESSING DATA FROM MULTIPLE IMAGE SOURCES TO PROVIDE NORMALIZED CONFIDENCE LEVELS FOR USE IN IMPROVING PERFORMANCE OF A RECOGNITION PROCESSOR

(71) Applicant: NCR Corporation, Duluth, GA (US)

(72) Inventor: Stephen C. Gawne, Waterloo (CA)

(73) Assignee: NCR Corporation, Atlanta, GA (US)

( * ) Notice: Subject to any disclaimer, the term of this patent is extended or adjusted under 35 U.S.C. 154(b) by 53 days.

(21) Appl. No.: 14/958,441

(22) Filed: Dec. 3, 2015

(65) Prior Publication Data

US 2016/0110596 A1 Apr. 21, 2016

Related U.S. Application Data

(62) Division of application No. 13/629,755, filed on Sep. 28, 2012, now Pat. No. 9,208,378.

(51) Int. Cl.
*G06K 9/00* (2006.01)
*G06K 9/62* (2006.01)

(52) U.S. Cl.
CPC ....... *G06K 9/00442* (2013.01); *G06K 9/6202* (2013.01); *G06K 9/6292* (2013.01)

(58) Field of Classification Search
None
See application file for complete search history.

(56) References Cited

U.S. PATENT DOCUMENTS

| 6,128,398 A * | 10/2000 | Kuperstein | G07C 9/00079 382/116 |
| 8,376,231 B2 * | 2/2013 | Huang | G06K 9/2018 235/439 |
| 8,610,976 B1 * | 12/2013 | Cook | G06T 5/50 358/463 |
| 2005/0097019 A1 * | 5/2005 | Jacobs | G06Q 20/042 705/35 |
| 2008/0025555 A1 * | 1/2008 | Visan | G06K 9/4604 382/100 |
| 2008/0030798 A1 * | 2/2008 | O'Neil | G07D 7/2016 358/448 |
| 2009/0018960 A1 * | 1/2009 | Gawne | G06Q 20/04 705/45 |

(Continued)

*Primary Examiner* — Manuchehr Rahmjoo
(74) *Attorney, Agent, or Firm* — Schwegman, Lundberg & Woessner

(57) ABSTRACT

A method comprises receiving from a first data source first recognition results which are associated with the first data source, and receiving from a second data source second recognition results which are associated with the second data source. The method further comprises, processing a first set of confidence levels associated with the first recognition results to provide a first set of normalized confidence levels associated with the first data source, and processing a second set of confidence levels associated with the second recognition results to provide a second set of normalized confidence levels associated with the second data source. The method also comprises storing the first set of normalized confidence levels associated with the first data source in a first table of normalized confidence levels and the second set of normalized confidence levels associated with the second data source in a second table of normalized confidence levels.

5 Claims, 7 Drawing Sheets

(56) References Cited

U.S. PATENT DOCUMENTS

| | | | |
|---|---|---|---|
| 2009/0152357 A1* | 6/2009 | Lei | G06F 17/30011 235/454 |
| 2009/0154778 A1* | 6/2009 | Lei | G06K 9/00456 382/112 |
| 2010/0258629 A1* | 10/2010 | Huang | G06K 9/2018 235/449 |
| 2012/0226600 A1* | 9/2012 | Dolev | G06Q 10/10 705/38 |

* cited by examiner

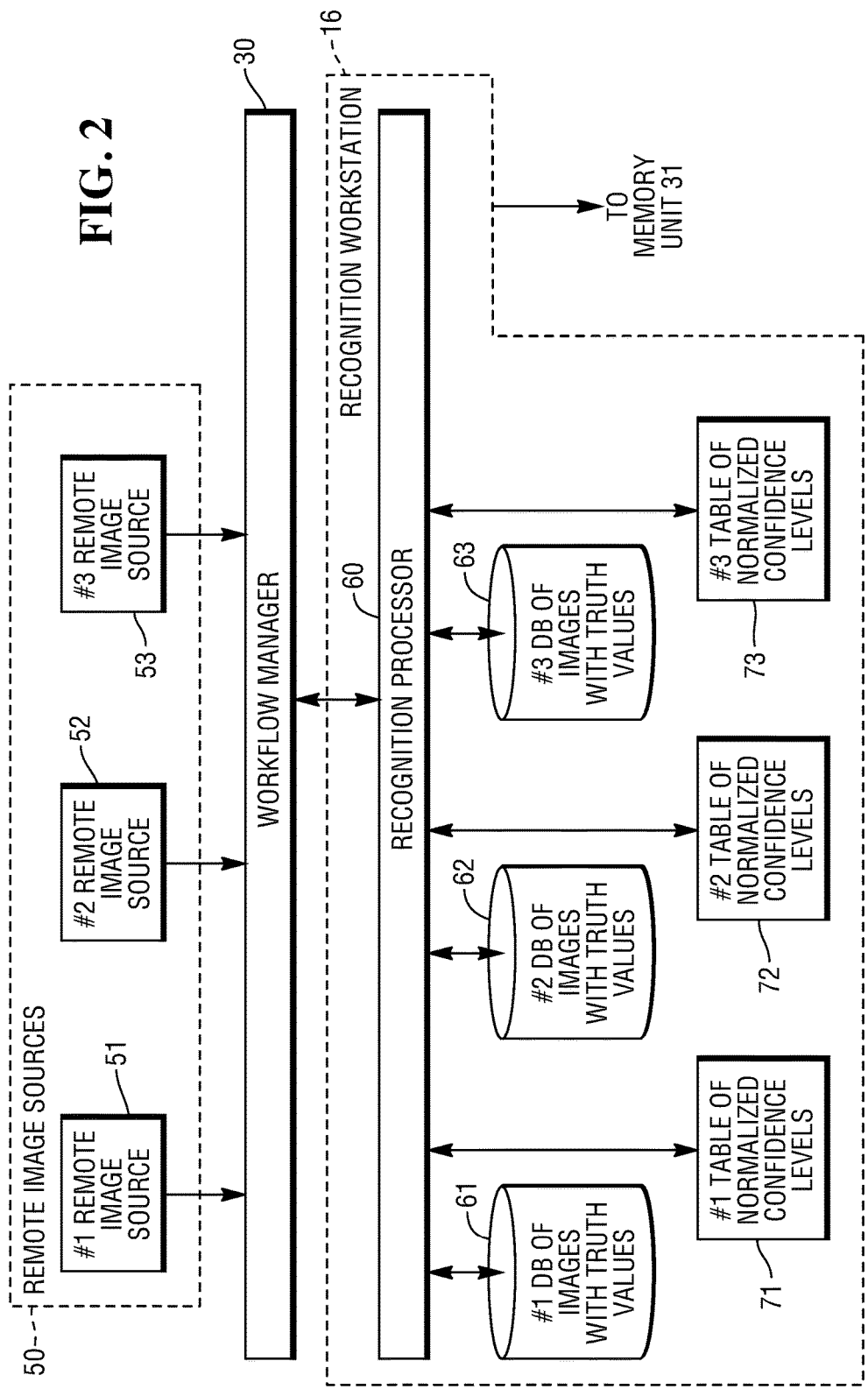

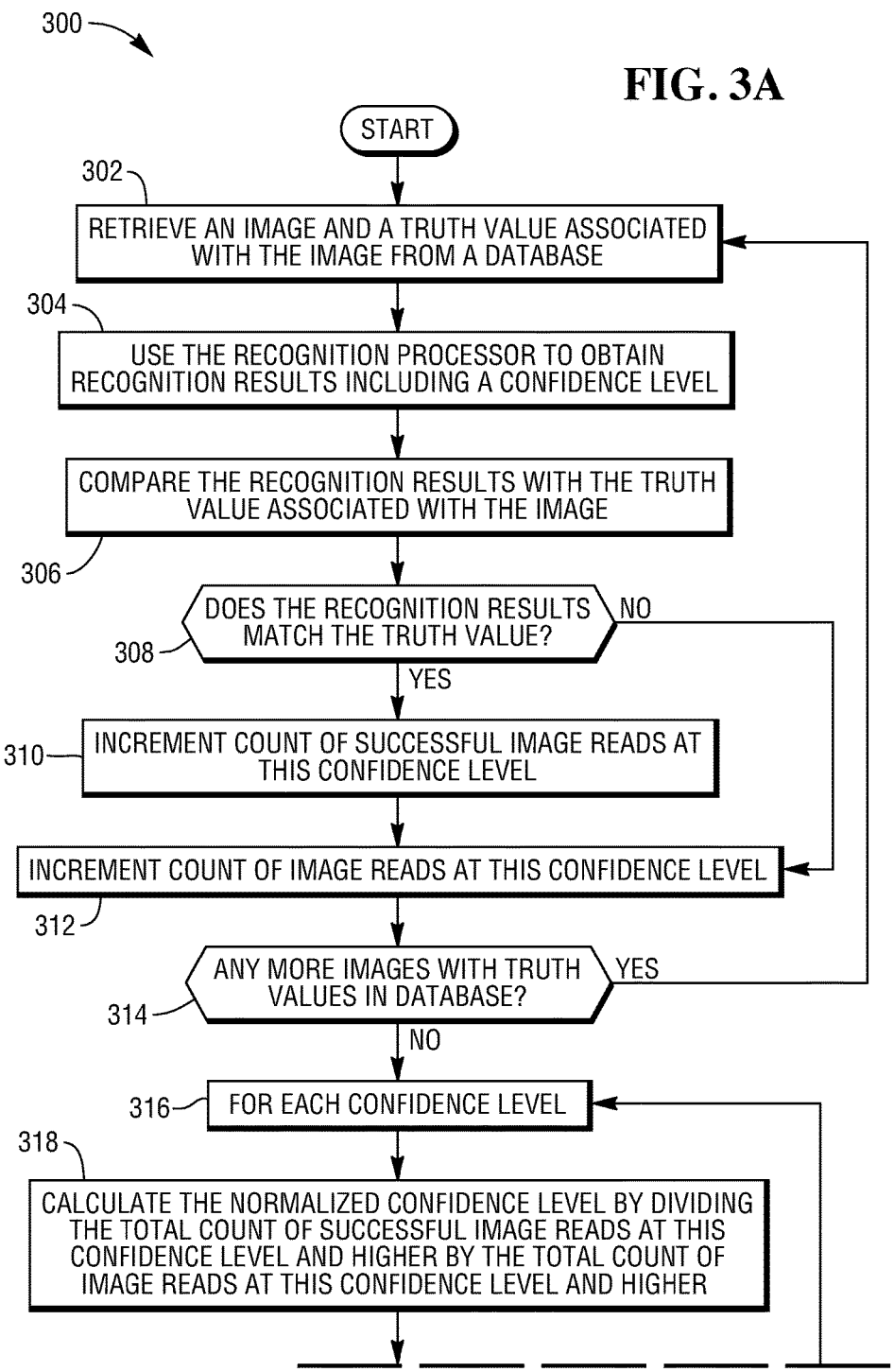

METHODS OF PROCESSING DATA FROM MULTIPLE IMAGE SOURCES TO PROVIDE NORMALIZED CONFIDENCE LEVELS FOR USE IN IMPROVING PERFORMANCE OF A RECOGNITION PROCESSOR

TECHNICAL FIELD

The present application relates to recognition engine performance, and is particularly directed to methods of processing data from multiple image sources to provide normalized confidence levels for use in improving performance of a recognition processor.

BACKGROUND

A remote check image capture device is an example of an image source. As an example, the remote check image capture device may comprise a tabletop check scanner located at a teller station of a bank branch to allow a bank teller to scan an image of a check to be deposited by a bank customer. As another example, the remote check image capture device may comprise a mobile device which has a built-in digital camera for capturing an image of a check to be deposited. Yet as another example, the remote check image capture device may comprise an automated teller machine (ATM) at which an image of a check to be deposited can be captured. These are example types of remote check image capture devices and are, therefore, example types of recognition sources.

When a depositor desires to deposit a check from a remote location in a check deposit transaction, the depositor uses a remote check image capture device to capture image data which is representative of an image of the check. The captured check image data is electronically sent to a back office facility of a financial institution, such as a bank, for further processing to complete the remote check deposit transaction. More specifically, a recognition engine is used to perform image recognition on the image data received from the remote check image capture device. The recognition engine provides recognition results which include a confidence level as is known. The recognition results including the confidence level are associated with the image source (i.e., the remote check image capture device) which provided the image data which is representative of the check image.

In some applications, a single remote check image capture device may provide multiple image sources (i.e., multiple types of images) of the same check item. For example, an ATM may be capable of capturing images under any combination of different types of light such as black and white, grayscale, color, infrared, and ultraviolet light. Each image source provides its own associated recognition results including confidence level.

A confidence level associated with an image source is specific to only that particular image source. A confidence level specific to one image source cannot be compared to a confidence level specific to another image source. Accordingly, a "best read" of recognition results from two different image sources cannot be obtained by comparing a confidence level associated with one image source and a confidence level associated with the other image source. It would be desirable to provide a method of processing image data from the two different image sources to provide normalized confidence levels which can be compared with each other so that the image source providing the "best read" of recognition results can be identified and selected.

SUMMARY

In accordance with one embodiment, a method comprises receiving from a first data source first recognition results which are associated with the first data source, and receiving from a second data source second recognition results which are associated with the second data source. The method further comprises electronically by a processor, processing a first set of confidence levels associated with the first recognition results to provide a first set of normalized confidence levels associated with the first data source, and electronically by a processor, processing a second set of confidence levels associated with the second recognition results to provide a second set of normalized confidence levels associated with the second data source. The method also comprises storing the first set of normalized confidence levels associated with the first data source in a first table of normalized confidence levels and the second set of normalized confidence levels associated with the second data source in a second table of normalized confidence levels.

BRIEF DESCRIPTION OF THE DRAWINGS

FIG. 2 is an enlargement of a portion of the schematic block representation of FIG. 1.

FIGS. 3A-3B form a flow diagram illustrating steps involved in generating tables which contain normalized confidence levels in accordance with one embodiment.

DETAILED DESCRIPTION

Figure 1:
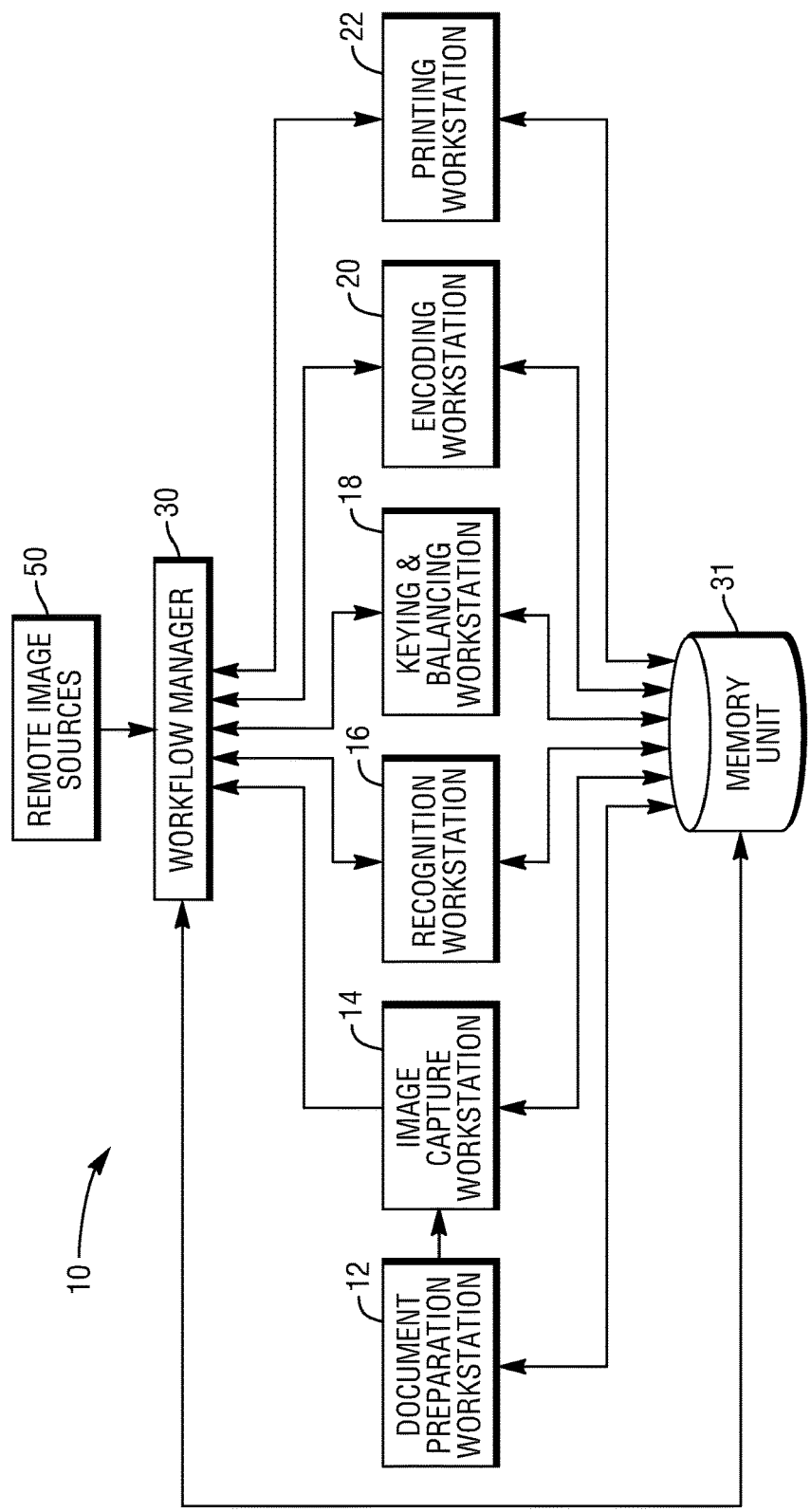
FIG. 1 is a schematic block representation of a number of different types of remote image capture devices in communication with an image-based check processing system in accordance with one embodiment.

The present application relates to recognition engine performance, and is particularly directed to methods of processing data from multiple image sources to provide normalized confidence levels for use in improving performance of a recognition processor. The specific type and construction of each of the multiple image sources may vary. Also, the specific environment in which the method described in the present application is used may vary. By way of example, an image-based document processing system in the form of an image-based check processing system 10 in accordance with one embodiment is illustrated in FIG. 1.

The image-based check processing system 10 comprises different types of workstations including document preparation workstation 12, image capture workstation 14, recognition workstation 16, keying and balancing workstation 18, encoding workstation 20, and printing workstation 22. Image capture workstation 14 creates units of work and submits the created work to workflow manager 30 in a known way. Each of workstations 16, 18, 20, 22 polls workflow manager 30 in a known manner for work to perform, and may also create units of work which is submitted to workflow manager 30.

At document preparation workstation 12, transaction items including a number of debit items and a number of credit items associated with each transaction are prepared for further processing. Typical transaction items include checks, deposit slips, and adding machine tapes. Checks, deposit slips, and certain other transaction items are classified as proof items. Adding machine tapes are classified as non-proof items. Preparation of transaction items may include removal of paper clips, staples, and the like, and stacking of the items in a particular order and/or direction in suitable trays. Trays containing the stacked items are then manually carted to image capture workstation 14.

At image capture workstation 14, the stacked items in trays are manually removed from the trays and placed onto an image lift transport (not shown) of image capture workstation 14. If the item being processed is adding machine tape, then a tape scanner (not shown) of known design and construction captures an electronic image of the adding machine tape and stores the image in memory unit 31. Memory unit 31 may comprise a single memory unit or a plurality of different memory units.

If the item being processed is a proof item such as a deposit slip, then the deposit slip is moved along a transport track of the image lift transport in front of a front image lift camera and in front of a rear image lift camera (both not shown). Each image lift camera optically scans the proof item as the proof item moves along the transport track in front of the cameras to produce front and rear electronic images of the proof item. These images are also stored in memory unit 31. Other proof items (transaction balancing slips, for example) are processed in the same manner.

If the item which is being processed is a proof item such as a check, then electronic images of the check are stored in memory unit 31 along with a unique sequence number. If the check being processed contains a MICR code line, then the MICR code line is read as the check passes by a MICR reader (not shown). Alternatively, if the check being processed contains an OCR code line, the OCR code line is read as the check passes by an OCR reader. The MICR code line or OCR code line, or both, are associated with the front and rear check images and are also stored in memory unit 31. Suitable endorsement is printed onto the check as the check passes an endorser module (not shown). An endorsement status associated with the check is then stored in memory unit 31 along with the other information associated with the check.

After check images are lifted by image lift cameras and information is stored in memory unit 31 as described hereinabove, the check is sorted into an appropriate sorter pocket (not shown) of image capture workstation 14. The sorted checks in each of the sorter pockets are stacked in a respective tray. The trays are then manually carted to the encoder workstation 20. The trays of checks are encoded in a known manner at encoder workstation 20 while the check images, the sequence numbers, and the MICR code line of the checks which were earlier captured and stored in memory unit 31 at the image capture workstation 14 are processed by the recognition workstation 16 and the keying and balancing workstation 18 in the manner described hereinbelow. An encoder status associated with the check is stored in memory unit 31.

At the recognition workstation 16, the check images stored in memory unit 31 after being processed at the image capture workstation 14 are processed using known recognition techniques to determine the "amount" associated with each check. The amount of each check is then associated with corresponding check images and the MICR code line of the check and stored in memory unit 31. A one-to-one correspondence is thereby established between the check images, the sequence number, the MICR code line, the endorsement status, the encoder status, and the amount associated with that particular check. Accordingly, a database containing check images, the sequence number, the MICR code line, the endorsement status, the encoder status, and the amount associated with each check is thereby created and stored in memory unit 31.

It should be noted that some check amounts will not be recognizable to recognition workstation 16. Also, some check amounts recognized at recognition workstation 16 may have a low confidence level associated therewith. These items are identified and processed further at keying and balancing workstation 18 which includes "amount keying", "code line completion", and "balancing" application programs, as is known. Structure and operation of keying and balancing workstations are known and, therefore, will not be described.

Referring to FIGS. 1 and 2, workflow manager 30 communicates with a number of different types of remote image sources 50. As an example shown in FIG. 2, workflow manager 30 communicates with three remote image sources which are designated with reference numerals 51, 52, 53. Although there are three remote image sources shown in FIG. 2, it is conceivable that any number of remote image sources could have been shown.

As an example, remote image source may be located at a merchant facility, such as a retail grocery store, for allowing a retail merchant to capture an image of a check received from a retail customer during a retail transaction. Remote image source may comprise a scanner which is part of a point-of-sale (POS) terminal. Remote image source may comprise a commercial-grade, digital flatbed scanner.

As another example, remote image source may be located in a home of a consumer, such as a home office, for allowing the consumer to capture an image of a check to be deposited. Remote image source may comprise a non-commercial-grade, digital flatbed scanner.

As another example, remote image source may comprise a mobile device, such as a cell phone, which has a built-in digital camera for capturing an image of a check to be deposited. The mobile device with built-in digital camera is carried by a mobile device user and goes where the mobile device user goes.

As still another example, remote image source may be located at a financial institution, such as a bank branch. Remote image source may comprise a tabletop check scanner located at a teller station of a bank branch to allow a bank teller to scan and capture images of checks to be deposited by a bank customer.

As yet another example, remote image source may comprise an image-based self-service check depositing terminal, such as an image-based check depositing automated teller machine (ATM), at which a check can be deposited. These are only example types of remote image sources, and other types of remote image sources are possible.

As shown in FIG. 2, recognition workstation 16 includes recognition processor 60 which communicates with workflow manager 30. Recognition processor 60 also communicates with databases 61, 62, 63 which store check images and truth values associated with the check images. As is known, a stored truth value is associated with the corresponding stored check image, and is the "correct answer" (for example, the correct amount of the check) for that particular stored check image. There is a one-to-one correspondence between a stored check image and a stored truth value. Remote image sources 51, 52, 53 are image sources for the check images and truth values stored in databases 61, 62, 63, respectively.

Recognition processor 60 also communicates with data tables 71, 72, 73 which contain normalized confidence levels associated with remote image sources 51, 52, 53, respectively. Accordingly, tables 71, 72, 73 are associated with databases 61, 62, 63, respectively. More specifically, check images and truth values stored in databases 61, 62, 63 are processed to provide normalized confidence levels contained in tables 71, 72, 73, respectively, using a method in accordance with one embodiment, as will be described in detail hereinbelow.

Figure 3B:
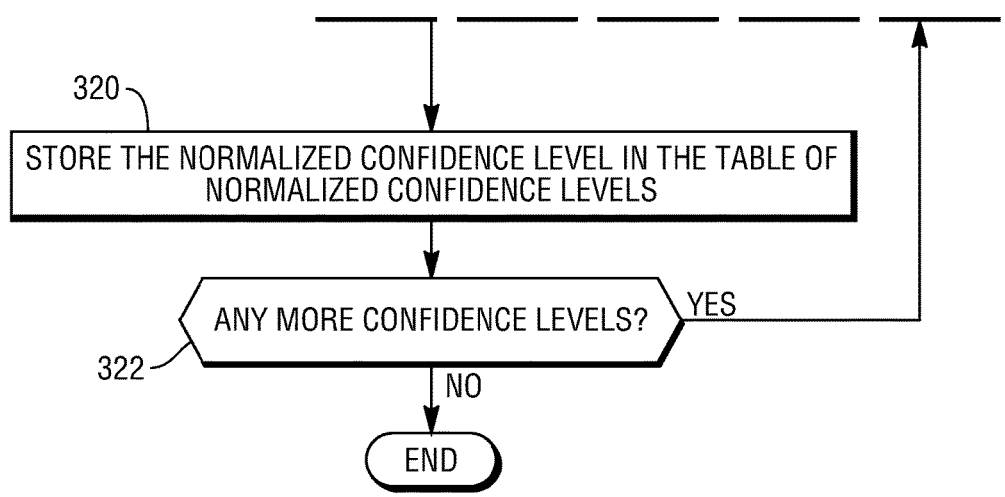

Referring to FIGS. 3A-3B, flow diagram 300 depicts steps involved by recognition processor 60 in generating tables 71, 72, 73 which contain normalized confidence levels in accordance with one embodiment. For purposes of explanation, it will be assumed that recognition processor 60 has already stored some check images with their associated truth values in each of databases 61, 62, 63 for each of image sources 51, 52, 53, respectively, in known manner. It will also be assumed that each of tables 71, 72, 73 has already been created, and that each of tables contains at least some normalized confidence levels. For simplicity, only check images from database 61 and normalized confidence levels from table 71 will be described herein.

As shown in step 302, a check image and a truth value associated with the check image are retrieved from database 61. Then, in step 304, recognition processor 60 obtains recognition results including a confidence level for the retrieved check image. Recognition results obtained in step 304 are compared with the truth value associated with the check image, as shown in step 306.

A determination is made in step 308 as to whether the recognition results obtained back in step 304 match the truth value. If determination in step 308 is affirmative (i.e., the recognition results and the truth value match), the process proceeds to step 310. In step 310, a counter which keeps count of successful check image reads at this particular confidence level is incremented. Also, as shown in step 312, a counter which keeps count of all check image reads (i.e., whether successful or unsuccessful) at this particular confidence level is incremented. However, if determination back in step 308 is negative (i.e., the recognition results and the truth value do not match), the process skips step 310 and proceeds directly to step 312. Accordingly, the count of the counter in step 312 can only be equal to or greater than the count of the counter in step 310.

From step 312, the process proceeds to step 314 in which a determination is made as to whether there are any more check images with truth values in database 61 to be processed. If determination in step 314 is affirmative (i.e., there are more check images with truth values in database 61 to be retrieved and processed), then the process loops back to step 302 to retrieve and process the next check image and associated truth value in the same manner as just described hereinabove for the previous check image. However, if determination in step 314 is negative (i.e., there are no more check images with truth values in database 61 to retrieve and process), the process proceeds to step 316.

As shown in steps 316 and 318, a normalized confidence level is calculated for each confidence level. More specifically, a normalized confidence level is calculated for each confidence level by dividing the total count of successful check image reads at this confidence level and higher (i.e., the total count from the counter in step 310) by the total count of check image reads at this confidence level and higher (i.e., the total count from the counter in step 312). A number of examples of these calculations are described hereinbelow. The calculated normalized confidence level for each confidence level is then stored in table 71 of normalized confidence levels, as shown in step 320.

Figure 4:
FIG. 4 is an example table of data showing normalized confidence levels which are calculated and obtained in the flow diagram of FIGS. 3A-3B.

Example confidence levels and their corresponding calculated normalized confidence levels are shown in table 80 of FIG. 4. More specifically, column A shows each confidence level, and column F shows the corresponding calculated normalized confidence level. Column B shows the total count from the counter in step 312 for each confidence level, and column D shows the total count from the counter in step 310 for each confidence level.

Column C is derived from column B. More specifically, for each confidence level in column C, the number shown in column C is the sum of the corresponding number shown in column B and all numbers in column B which are associated with higher confidence levels. As an example, the number "1225" in column C (for confidence level of 98%) is the sum of the number "25" which is the corresponding number shown in column B (for confidence level of 98%) and the numbers "200" and "1000" which are the corresponding numbers shown in column B (for confidence levels of 99% and 100%, respectively). As another example, the number "1200" in column C (for confidence level of 99%) is the sum of the number "200" which is the corresponding number shown in column B (for confidence level of 99%) and the number "1000" which is the corresponding number shown in column B (for the confidence level of 100%).

Similarly, column E is derived from column D. More specifically, for each confidence level in column E, the number shown in column E is the sum of the corresponding number shown in column D and all numbers in column D which are associated with higher confidence levels. As an example, the number "1145" in column E (for confidence level of 99%) is the sum of the number "150" which is the corresponding number shown in column D (for confidence level of 99%) and the number "995" which is the corresponding number shown in column D (for confidence level of 100%). As another example, the number "2048" in column E (for confidence level of 95%) is the sum of the number "500" which is the corresponding number shown in column D (for confidence level of 95%) and the numbers "100", "280", "23", "150", and "995" which are the corresponding numbers shown in column D (for confidence levels of 96%, 97%, 98%, 99%, and 100%, respectively).

It should be apparent from the above description of step 318 that each normalized confidence level shown in column F of FIG. 4 is calculated by dividing the corresponding number in column E by the corresponding number in column C. As an example, the normalized confidence level of 100% shown in column F of FIG. 4 is calculated by dividing the corresponding number of "995" shown in column E with the corresponding number of "1000" shown in column C. As another example, the normalized confidence level of 92% shown in column F of FIG. 4 is calculated by dividing the corresponding number of "1548" shown in column E by the corresponding number of "1675" shown in column C. Still as another example, the normalized confidence level of 88% shown in column F of FIG. 4 is calculated by dividing the corresponding number of "2348" shown in column E by the corresponding number of "2675" shown in column C.

As shown in the process loop between step 322 and step 316, the calculating step of 318 and the storing step of 320 are performed for each confidence level. Accordingly, each confidence level has an associated normalized confidence level stored in table 71. Once a determination is made in step 322 that there are no more confidence levels to normalize, the process ends.

Figure 5A:
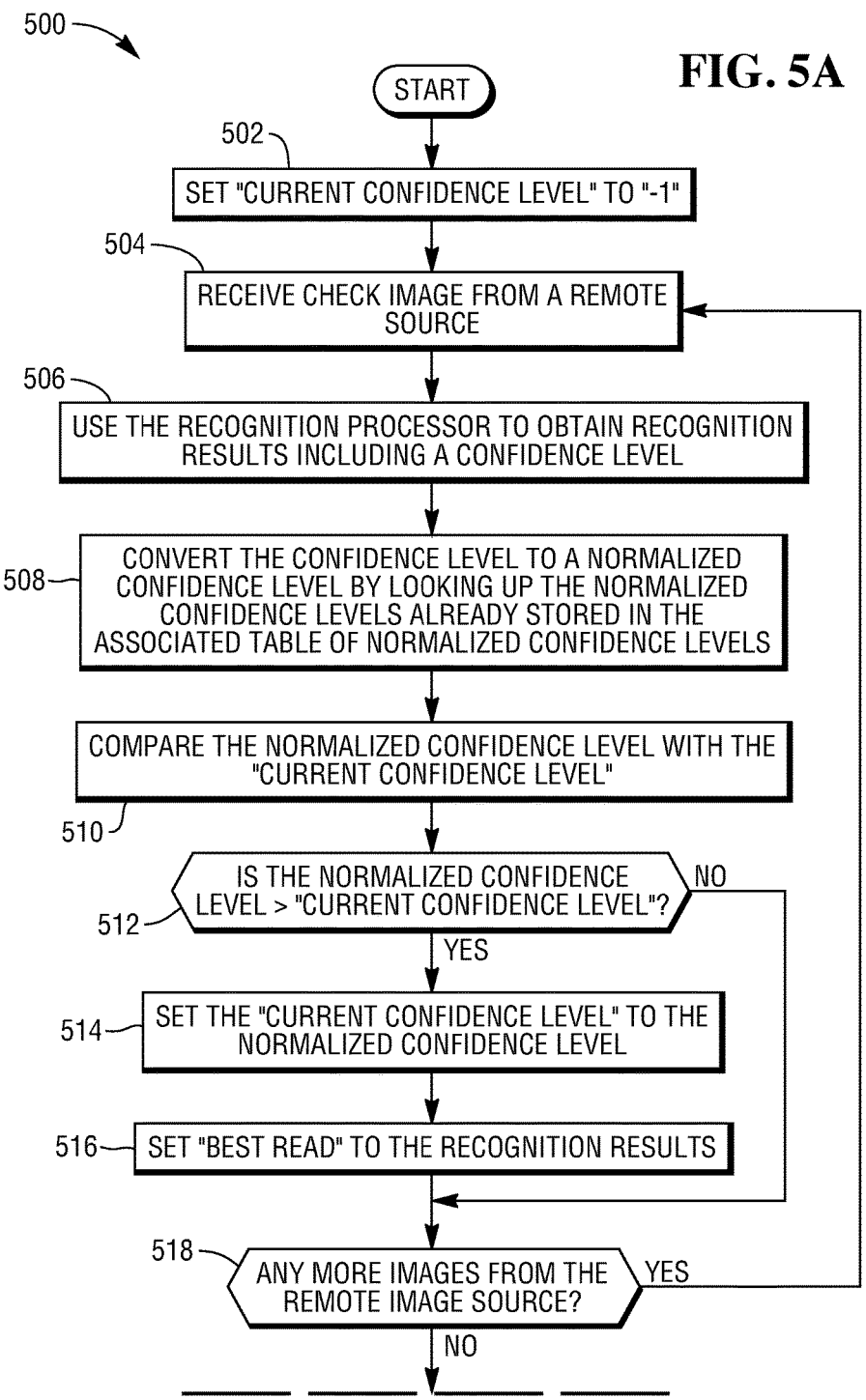
FIGS. 5A-5B form a flow diagram illustrating steps involved in selecting one of a multiple number of different recognition results based upon comparison of normalized confidence levels contained in the generated tables of FIGS. 3A-3B.
Figure 5B:
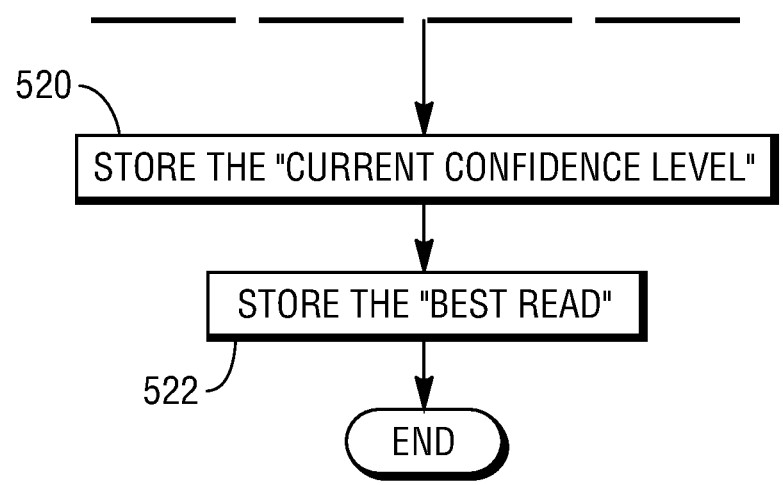

Referring to FIGS. 5A-5B, flow diagram 500 depicts steps involved by recognition processor 60 (FIG. 2) in selecting one of a multiple number of recognition results (i.e., the "best read") based upon comparison of normalized confidence levels contained in tables 71, 72, 73 in accordance with one embodiment. For simplicity, only check images from database 61 and normalized confidence levels from table 71 will be described herein.

As shown in step 502, a variable which is named "current confidence level" is set to a value of "−1". In step 504, a check image is received from one of the remote image sources 50 (FIG. 2). In step 506, recognition processor 60 obtains in known manner recognition results including a confidence level for the check image.

Then, in step 508, the confidence level obtained in step 506 is converted to a normalized confidence level. This conversion is performed by looking up normalized confidence levels already stored in the associated table of normalized confidence levels (which in this case is table 71). More specifically, the conversion is performed by using the confidence level obtained in step 506 as an index into the normalized confidence levels stored in table 71. As an example, with reference to FIG. 4, if the confidence level is 99% (column A), then the corresponding normalized confidence level is 95% (column F). As another example, if the confidence level is 97% (column A), then the corresponding normalized confidence level is 95% (column F). Yet as another example, if the confidence level is 95% (column A), then the corresponding normalized confidence level is 90% (column F).

In step 510, the normalized confidence level obtained from step 508 is compared with the current confidence level. A determination is made in step 512 as to whether the normalized confidence level is greater than the current confidence level. If determination in step 512 is affirmative (i.e., the normalized confidence level is greater than the current confidence level), the process proceeds to step 514. In step 514, the current confidence level is set to the normalized confidence level. Also, as shown in step 516, a variable which is named "best read" is set to the recognition results obtained back in step 506. The process proceeds to step 518. However, if determination back in step 512 is negative (i.e., the normalized confidence level is not greater than the current confidence level), the process skips steps 514 and 516 and proceeds directly to step 518.

A determination is made in step 518 as to whether there are any more check images from the one of the remote image sources 50 to be received and processed. If determination in step 518 is affirmative (i.e., there is another check image from the one remote image source to be processed), the process proceeds back to step 504 to process the next check image. Steps 504 through steps 516 are repeated for this next image.

It should be apparent that if the normalized confidence level of this next check image is greater than the normalized confidence level of the previous check image, then the current confidence level will be set to the higher normalized confidence level of this next check image. However, if the normalized confidence level of this next check image is not greater than the normalized confidence level of the previous check image, then the variable "current confidence level" remains set to the normalized confidence level of the previous check image.

It should also be apparent that by way of the process loop between step 518 and step 504, the "best read" of recognition results corresponds to that check image having the highest normalized confidence level associated therewith. The number of times that the process loop between step 518 and step 504 repeats itself depends upon the number of check images processed. The "best read" of recognition results is provided independent of the number of times the process loop between step 518 and step 504 is repeated, and will correspond to that check image having the highest normalized confidence level associated therewith.

From step 518, the process proceeds to step 520. In step 520, the variable "current confidence level" (which is now set to the highest normalized confidence level) is stored in database 61. Also, as shown in step 522, the variable "best read" (which is now set to the recognition results having the highest normalized confidence level) is stored in database 61. The process then terminates.

It should be apparent that the example method described hereinabove combines recognition results of recognition processor 60 running against multiple image sources (i.e., the remote image sources 51, 52, 53 in this example) to improve recognition performance. By normalizing confidence levels associated with recognition results stored in databases 61, 62, 63 and storing the normalized confidence levels in tables 71, 72, 73, respectively, a confidence level associated with one image source (i.e., one of the remote image sources 51, 52, 53) can be compared with a confidence level associated with another image source (i.e., another one of the remote image sources 51, 52, 53). The highest normalized confidence level is identified by comparing the normalized confidence levels. Accordingly, recognition results associated with the highest normalized confidence level (i.e., the "best read") is identified and selected.

The above-described confidence levels normalizing feature may be implemented by an algorithm which is expressed in a computer program containing executable instructions which, when executed, carry out steps of the algorithm to provide the feature. The confidence levels normalizing feature places confidence levels of a multiple number of recognition results on a common basis (i.e., normalized basis), and thereby allows the normalized confidence levels to be compared with each other so that the "best read" of the multiple number of recognition results (i.e., the recognition results with the highest normalized confidence level) can be identified and selected. The result is improved recognition performance.

The above-described example method is performed by a computer having a memory executing one or more programs of instructions which are tangibly embodied in a program storage medium readable by the computer. A single computer may perform the example method described hereinabove. However, it is conceivable that more than one computer perform the example method described hereinabove.

Although the above description describes each of remote image sources 51, 52, 53 functioning as a single image source, it is conceivable any one of the remote image sources 51, 52, 53 may function as a multiple image source. As an example, one of the remote image sources 51, 52, 53 may provide a bitonal image of a check and a grayscale image of the same check to function as two image sources. As another example, one of the remote image sources 51, 52, 53 may provide a bitonal image of a check, a grayscale image of the same check, and a color image of the same check to function as three image sources.

Although the above description describes combining recognition results of a single recognition processor running against multiple image sources, it is conceivable that recognition results of multiple recognition processors running against a single image source may be combined.

Also, although the above description describes databases 61, 62, 63 being located at the same location as recognition processor 60, it is conceivable that databases 61, 62, 63 be located at a location which is remote from recognition processor 60. It is also conceivable that tables 71, 72, 73 be located at a location which is remote from recognition processor 60 or databases 61, 62, 63, or both.

Further, although the above description describes a document in the form of a check (which can be of a personal type or of a business type), it is conceivable that the document may comprise any type of document on which image recognition can be performed.

Although the above description describes image sources as providing image type data, it is conceivable that non-image sources may provide non-image type data. It is also conceivable that one or more sources may provide a combination of image type data and non-image type data. Moreover, it is conceivable that one or more sources may provide data which is other than document type data (i.e., data which is from other than documents).

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of operating a workflow manager and a recognition processor to improve document recognition performance, the method comprising:

receiving, by the workflow manager, first image data which is representative of a first image of a document, wherein receiving further includes receiving the first image data from a first remote image capture device that is a scanner and is part of a Point-Of-Sale (POS) terminal located at a retail merchant;

receiving, by the workflow manager, second image data which is representative of a second image of the document, wherein receiving further includes receiving the second image data from a second remote image capture device that is a built-in digital camera of a mobile device;

providing, by the workflow manager, the first image data and the second image data to the recognition processor that is included within a recognition workstation;

electronically, by the recognition processor, processing at least a portion of the first image data to provide a first set of normalized image data;

electronically, by the recognition processor, processing at least a portion of the second image data to provide a second set of normalized image data;

electronically, by the recognition processor, selecting one of the first and second image data based upon the first and second sets of normalized image data.

2. A method according to claim 1, wherein (i) the first set of normalized image data includes a first set of normalized confidence levels associated with the first image data, and (ii) the second set of normalized image data includes a second set of normalized confidence levels associated with the second image data.

3. A method according to claim 2, further comprising:

electronically by the recognition processor, comparing confidence levels from the first set of normalized confidence levels with confidence levels from the second set of normalized confidence levels.

4. A method according to claim 3, wherein selecting one of the first and second image data based upon the first and second sets of normalized image data includes selecting one of the first and second image data based upon comparison of confidence levels from the first set of normalized confidence levels with confidence levels from the second set of normalized confidence levels.

5. A method according to claim 1, wherein the method is performed by a computer having a memory executing one or more programs of instructions which are tangibly embodied in a program storage medium readable by the computer.

* * * * *